United States Patent
Sayyed et al.

(10) Patent No.: US 11,347,856 B2
(45) Date of Patent: May 31, 2022

(54) BIOS METHOD TO BLOCK COMPROMISED PREBOOT FEATURES

(71) Applicant: Dell Products L.P., Round Rock, TX (US)

(72) Inventors: Ibrahim Sayyed, Georgetown, TX (US); Alok Pant, Austin, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 16/422,667

(22) Filed: May 24, 2019

(65) Prior Publication Data
US 2020/0372156 A1 Nov. 26, 2020

(51) Int. Cl.
*G06F 21/57* (2013.01)
*G06F 9/4401* (2018.01)

(52) U.S. Cl.
CPC .......... *G06F 21/572* (2013.01); *G06F 9/4406* (2013.01); *G06F 21/577* (2013.01); *G06F 2221/033* (2013.01)

(58) Field of Classification Search
CPC .... G06F 21/572; G06F 9/4406; G06F 21/577; G06F 2221/033
See application file for complete search history.

(56) References Cited

U.S. PATENT DOCUMENTS

| | | | |
|---|---|---|---|
| 7,363,480 B1* | 4/2008 | Righi | G06F 8/65 709/219 |
| 8,656,146 B2* | 2/2014 | Findeisen | G06F 21/575 713/2 |
| 9,672,112 B2* | 6/2017 | Roche | G06F 11/1417 |
| 9,881,159 B1* | 1/2018 | Wilson | H04L 63/126 |
| 2006/0209328 A1* | 9/2006 | Anderson | G06F 9/4411 358/1.13 |
| 2007/0150418 A1* | 6/2007 | Ben-Menahem | G06F 21/10 705/59 |
| 2009/0172381 A1* | 7/2009 | Zimmer | G06F 9/4401 713/2 |
| 2009/0210689 A1* | 8/2009 | Harmer | G06F 9/4401 713/2 |
| 2009/0276617 A1* | 11/2009 | Grell | G06F 21/575 713/2 |

(Continued)

OTHER PUBLICATIONS

Windows Platform Binary Table (WPBT), Microsoft, Jul. 9, 2015.

*Primary Examiner* — Aurel Prifti
(74) *Attorney, Agent, or Firm* — Jackson Walker L.L.P.

(57) ABSTRACT

An information handling system may include at least one processor, a memory coupled to the at least one processor, and an information handling resource including a firmware. The information handling system may be configured to: boot into an operating system stored on the memory; after booting into the operating system, receive, from at least one remote server, information regarding a vulnerability associated with the firmware; based on a security policy, determine a resolution for mitigation of the vulnerability; and store information regarding the resolution in a storage location accessible to a preboot environment of the information handling system, wherein the preboot environment is configured to apply the resolution upon a subsequent boot of the information handling system.

15 Claims, 3 Drawing Sheets

(56) References Cited

U.S. PATENT DOCUMENTS

| | | | |
|---|---|---|---|
| 2012/0239660 A1* | 9/2012 | Patel | G06F 16/2272 707/741 |
| 2014/0068594 A1* | 3/2014 | Young | G06F 21/572 717/172 |
| 2014/0215196 A1* | 7/2014 | Berlin | G06F 21/572 713/2 |
| 2014/0281577 A1* | 9/2014 | Nicholes | G06F 21/85 713/189 |
| 2015/0363712 A1* | 12/2015 | Berke | G06F 21/105 705/7.12 |
| 2015/0370575 A1* | 12/2015 | Tonry | G06F 21/10 713/2 |
| 2016/0180094 A1* | 6/2016 | Dasar | G06F 21/575 714/36 |
| 2016/0210457 A1* | 7/2016 | Cleeton | G06F 21/60 |
| 2016/0231804 A1* | 8/2016 | Bulusu | G06F 9/4401 |
| 2016/0275291 A1* | 9/2016 | Campbell | G06F 21/575 |
| 2016/0364243 A1* | 12/2016 | Puthillathe | G06F 9/4406 |
| 2017/0054354 A1* | 2/2017 | Misawa | H02K 41/031 |
| 2017/0109531 A1* | 4/2017 | Wang | H04L 9/3234 |
| 2017/0235928 A1* | 8/2017 | Desai | G06F 9/4401 713/2 |
| 2017/0308706 A1* | 10/2017 | Ray | G06F 9/4416 |
| 2018/0004502 A1* | 1/2018 | Samuel | G06F 8/71 |
| 2018/0004506 A1* | 1/2018 | Annapureddy | G06F 8/654 |
| 2018/0276000 A1* | 9/2018 | Roszak | G06F 9/452 |
| 2018/0349607 A1* | 12/2018 | Khatri | G06F 21/575 |
| 2019/0042754 A1* | 2/2019 | Jreij | G06F 21/575 |
| 2019/0163497 A1* | 5/2019 | Samuel | G06F 9/4411 |
| 2019/0179628 A1* | 6/2019 | Bulusu | G06F 8/656 |
| 2019/0266331 A1* | 8/2019 | Sanchez Diaz | G06F 21/51 |
| 2020/0097658 A1* | 3/2020 | Samuel | G06F 11/0793 |
| 2020/0272738 A1* | 8/2020 | Shroff | G06F 8/65 |
| 2021/0081543 A1* | 3/2021 | Ferreira | G06F 21/71 |

* cited by examiner

BIOS METHOD TO BLOCK COMPROMISED PREBOOT FEATURES

TECHNICAL FIELD

The present disclosure relates in general to information handling systems, and more particularly to systems and methods for addressing vulnerabilities that may be discovered in firmware devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are frequently subject to security vulnerabilities. For example, some types of security vulnerabilities may target flaws in the code of operating systems or applications. Other vulnerabilities may target the firmware of an information handling system or of some component thereof.

Although operating system updates and application updates tend to happen relatively frequently (and in some cases even automatically), many users are less likely to update vulnerable firmware modules in a timely manner. Thus firmware vulnerabilities have the potential to be longer-lasting and more serious.

According to some embodiments of the present disclosure, such vulnerabilities may be mitigated may controlling whether a device driver (e.g., a Unified Extensible Firmware Interface (UEFI)) driver is loaded, and whether any features of the driver are disabled.

Existing security enforcement policies typically only work at the level of verifying cryptographic signatures. Cryptographic keys are needlessly rigid as an enforcement mechanism, however, as this test is only capable of giving a "yes"/"no" answer as to whether or not the driver is approved to load. According to embodiments of the present disclosure, however, a security enforcement technique may go a layer deeper to include security policies and additional dynamic checks.

This disclosure provides additional level of policy-based enhanced protection against vulnerabilities where firmware/BIOS updates are not possible or have not yet been installed. Those policies may be deployed by a software agent executing on an operating system. Policies may be cryptographically signed by a manufacturer of an information handling system, such that only the manufacturer can deploy the policies to manage the behavior against validation results. These policies may be exposed to administrators, for example, in some embodiments via Windows Management Instrumentation (WMI) and other alerts to allow administrators to take appropriate actions.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with vulnerabilities in information handling systems may be reduced or eliminated.

In accordance with embodiments of the present disclosure, an information handling system may include at least one processor, a memory coupled to the at least one processor, and an information handling resource including a firmware. The information handling system may be configured to: boot into an operating system stored on the memory; after booting into the operating system, receive, from at least one remote server, information regarding a vulnerability associated with the firmware; based on a security policy, determine a resolution for mitigation of the vulnerability; and store information regarding the resolution in a storage location accessible to a preboot environment of the information handling system, wherein the preboot environment is configured to apply the resolution upon a subsequent boot of the information handling system.

In accordance with these and other embodiments of the present disclosure, a method may include booting an information handling system into an operating system, wherein the information handling system comprises an information handling resource that includes a firmware; after booting into the operating system, the information handling system receiving, from at least one remote server, information regarding a vulnerability associated with the firmware; based on a security policy, the information handling system determining a resolution for mitigation of the vulnerability; and the information handling system storing information regarding the resolution in a storage location accessible to a preboot environment of the information handling system, wherein the preboot environment is configured to apply the resolution upon a subsequent boot of the information handling system.

In accordance with these and other embodiments of the present disclosure, an article of manufacture may include a non-transitory, computer-readable medium having computer-executable code thereon that is executable by a processor of an information handling system for: booting into an operating system; after booting into the operating system, receiving, from at least one remote server, information regarding a vulnerability associated with a firmware of an information handling resource of the information handling system; based on a security policy, determining a resolution for mitigation of the vulnerability; and storing information regarding the resolution in a storage location accessible to a preboot environment of the information handling system, wherein the preboot environment is configured to apply the resolution upon a subsequent boot of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
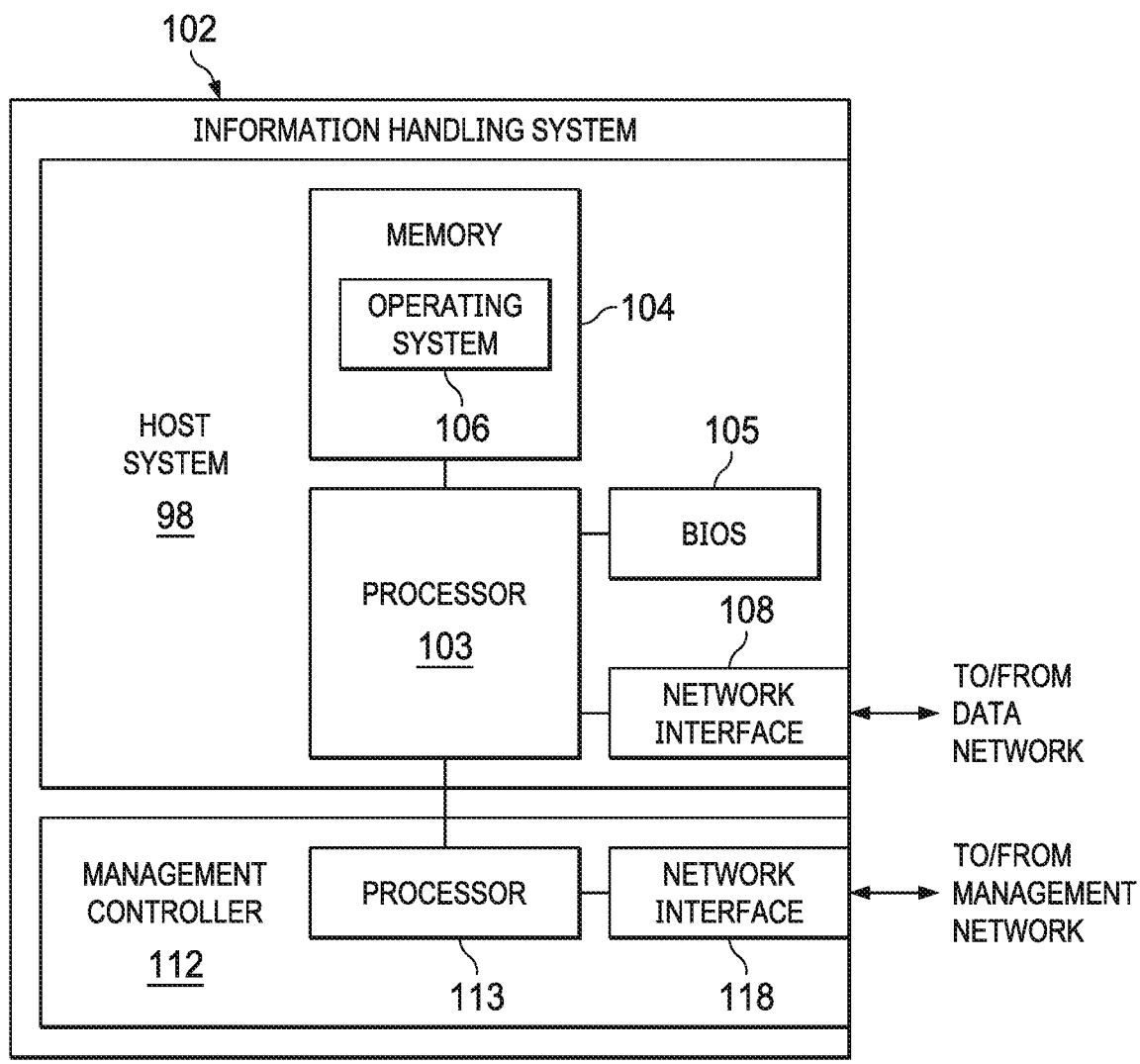
FIG. 1 illustrates a block diagram of an example information handling system, in accordance with embodiments of the present disclosure.
Figure 2:
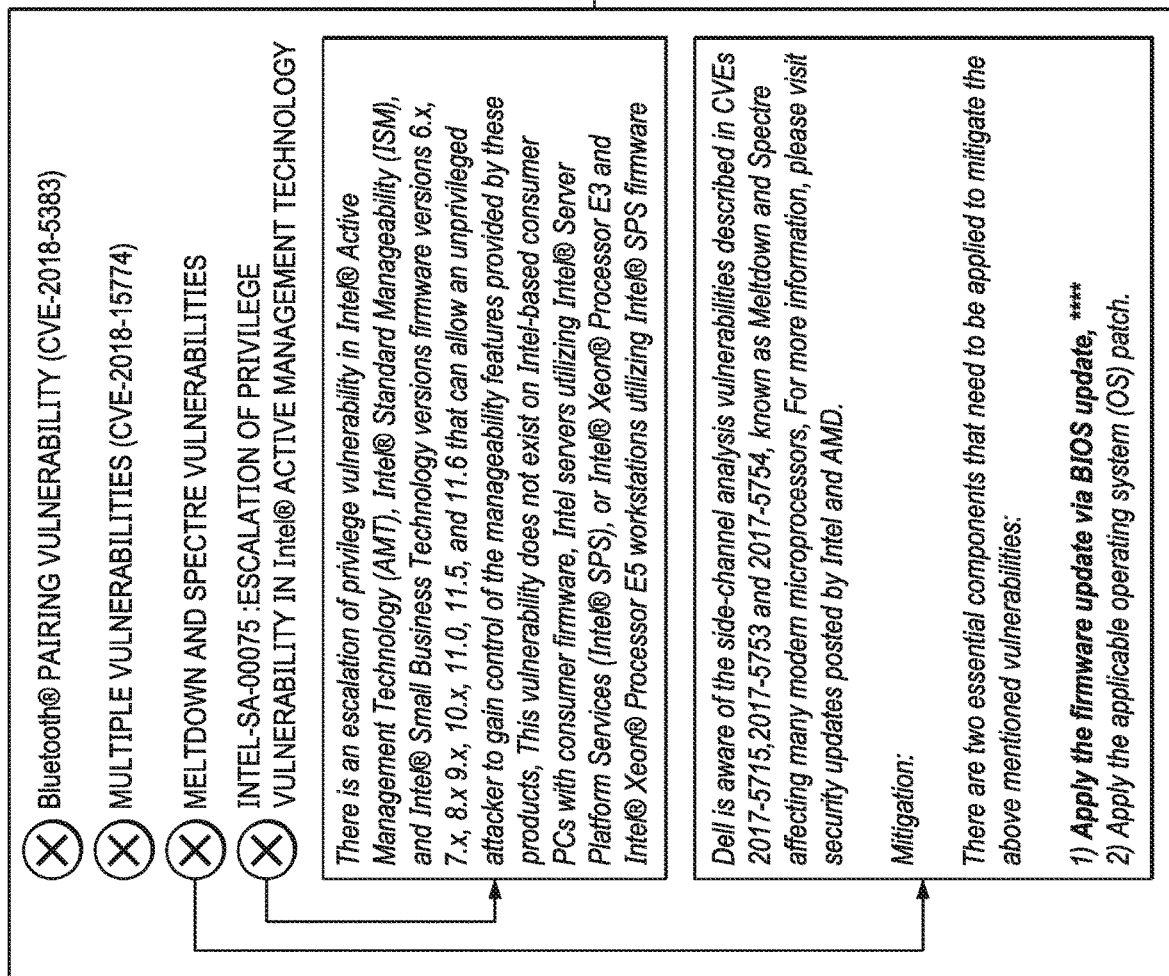
FIG. 2 illustrates an example flow diagram of a method in accordance with embodiments of the present disclosure.
Figure 3:
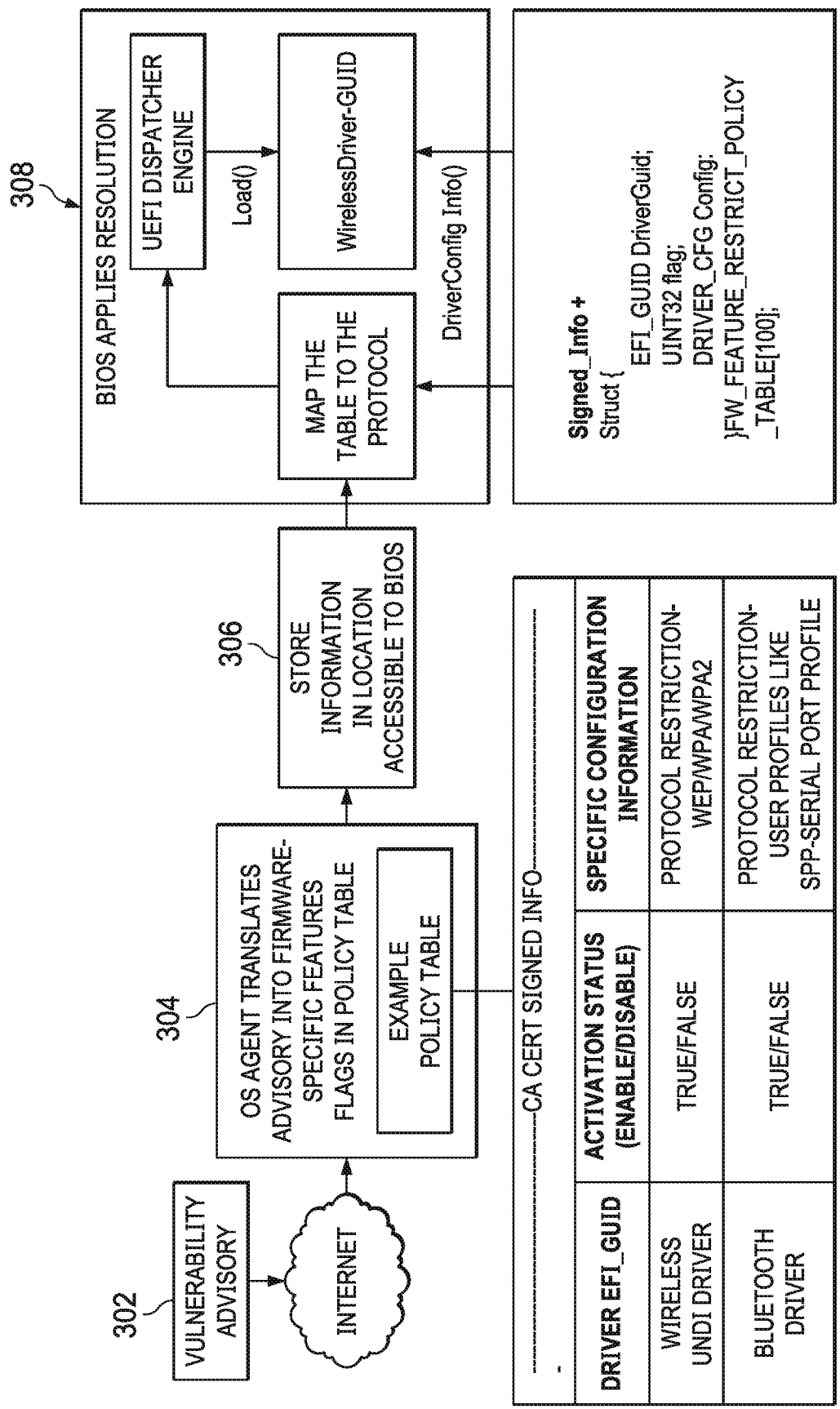
FIG. 3 illustrates an example flow diagram of a method in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

In some embodiments, information handling system 102 may include a storage area that is accessible to both of operating system 106 and BIOS 105. For example, such a storage area may be a designated portion of a storage resource such as a hard drive or NVRAM. In some embodiments, operating system 106 may access such a storage area via the use of a persistent software agent (e.g., a BIOS persistent agent) that is presented to the operating system via a communication channel such as the Windows Platform Binary Table (WPBT).

Such a persistent agent may execute on operating system 106 as a background service to receive vulnerability information, create policies, store information in the designated storage space, etc. as described in more detail below. During a subsequent reboot of information handling system 102, BIOS 105 may check the designated storage space for such information that has been stored by the persistent agent and take appropriate action, as described in further detail below.

As noted above, embodiments of this disclosure may enable mitigation of firmware-based vulnerabilities. For example, an operating system (or a software agent executing thereon) may receive information about a firmware vulnerability affecting an information handling system. The operating system (or software agent) may then push a policy update to the device firmware to restrict or disable a particular feature that is compromised by the vulnerability. In other embodiments, a compromised device may be disabled entirely. In yet other embodiments, a warning may be issued to a user, providing the user with the option of disabling the feature and/or device. In general, all of these techniques may be referred to collectively as providing for the selective loading of drivers.

In some embodiments, a host operating system may flag a vulnerability to one or more affected BIOS firmware modules. The BIOS may then block the affected feature to prevent malicious actors from being able to exploit the vulnerability. In order to disable or restrict access to the feature on a running platform, the BIOS may enforce a policy (e.g., with user consent) to deactivate the feature until the appropriate remediation or patch is available from the hardware vendor.

Embodiments of this disclosure thus allow for reducing the impact of exploits, while keeping as much functionality as possible in working order. Policies may be managed via a persistent agent executing on a host operating system. Such an agent may interact with one or more remote servers to monitor for updates regarding vulnerabilities.

In some embodiments, the agent may request such updates. For example, the agent might request only those updates that pertain to information handling resources that are installed. In other embodiments, the server may push updates to the agent without such a request. The agent may additionally perform user notifications, event log updates, etc. for auditing purposes.

FIG. 2 illustrates a flow chart of an example method 200 in accordance with embodiments of the present disclosure. At step 202, a vulnerability is flagged on the internet. For example, an advisory website on a remote server may include data regarding firmware vulnerabilities. Several example vulnerabilities are shown in FIG. 2. As shown, the information regarding the vulnerabilities may include specific information about features that are affected or not affected, how the vulnerability may be mitigated, etc.

Once such a vulnerability has been flagged by a remote server, information regarding the vulnerability may be passed to an OS-based BIOS persistent agent at step 204.

In some embodiments, the OS-based BIOS persistent agent may determine an appropriate policy to be enacted in response to the vulnerability. For example, the policy may include disabling a particular information handling resource, disabling certain affected features, etc. In other embodiments, the information passed to the OS-based BIOS persistent agent may include therein a policy (e.g., a set of rules) for responding to the vulnerability. Based on the policy, in some embodiments, the OS-based BIOS persistent agent may determine an appropriate resolution for mitigation of the vulnerability.

At step 206, the OS-based BIOS persistent agent may store the determined resolution in a storage space that is accessible to both the OS-based BIOS persistent agent and to a preboot environment of the information handling system. For example, such a preboot environment may include a BIOS of the information handling system, such as a UEFI BIOS. In particular, the resolution may be stored in such a way that it becomes accessible to any hardware firmware modules that are affected by the vulnerability. As noted above, one example of such a storage method is the use of a persistent software agent presented to the operating system via the use of a WPBT system.

At step 208, when the information handling system is next rebooted, the policy-based resolution is applied to the affected information handling resource. In some embodiments, the OS-based BIOS persistent agent may additionally trigger such a reboot or notify a user that a reboot is needed to protect the system.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

FIG. 3 illustrates a flow chart of another example method 300 in accordance with embodiments of the present disclosure. At step 302 (similar to step 202), a vulnerability is flagged on the internet.

At step 304, the OS-based BIOS persistent agent (referred to as simply an OS agent) may translate the advisory into firmware-specific feature flags for inclusion in a policy table. An example policy table is shown in FIG. 3. In this example, such a policy table may be cryptographically signed, and it may include information identifying specific firmware drivers (e.g., identified by GUID), as well as information regarding which features of an information handling resource and/or firmware should be enabled or disabled.

As one example, the policy may include a restriction regarding which types of Wi-Fi security protocols are usable by a wireless network device. For example, a vulnerability in the implementation of WPA2 might cause the device to operate only in WEP or WPA modes. Such a policy might be applied to only devices from a specific vendor, only devices having specific model numbers, only devices having serial numbers in a specific range, etc.

At step 306 (similar to step 206), the OS agent may store the policy table (or information related to the policy table) in a storage location accessible to the BIOS. For example, the OS agent may send the cryptographically signed firmware feature policy table (e.g., with UEFI driver GUIDs) and activate or deactivate selected flags associated with optional configuration information.

In some embodiments, drivers such as UEFI drivers may be part of a BIOS image. In the UEFI context, there is no existing method to block or unblock the selective driver loading. Further, such UEFI drivers are typically present a trusted SPI space, and so they generally may not be cryptographically signed (or in some cases, all UEFI drivers may be signed by a single key). Thus in many instances, there may not be a unique certificate present for each UEFI driver.

In some embodiments, a BIOS agent may also be placed in SPI space to produce a policy protocol with Loadflag such that configuration settings may be mapped to every driver's EFI_GUID.

Thus for every driver load, secure boot code may locate this protocol and check whether a driver load policy is defined or not for that driver. If a policy is defined and flagged as blocking the driver load, then the secure boot code may gate the driver to prevent loading that driver into memory.

All critical UEFI drivers may register their entries into a table referred to as the FW_FEATURE_RESTRICT_POLICY table. When the secure boot code tries to load the driver, it may verify whether the driver GUID flag is set to TRUE or FALSE in the table. If it set to FALSE, then the secure boot code may discard the driver load operation.

For example, the BIOS may in some embodiments search the EFI_GUID entries available in the table to determine whether the relevant devices and/or drivers are installed. The OS agent may then update the policy flag mapped to the driver GUIDs.

At step 308 (e.g., after a reboot of the information handling system), the BIOS may verify the cryptographic signature of the policy table and then apply the resolution(s) to the relevant firmware device(s). When the UEFI dispatcher loads a driver, a SecureBoot engine may check the state of this flag from the policy table and block or unblock a feature or device based on the state of the flag.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   a memory coupled to the at least one processor; and
   an information handling resource including a firmware;
   wherein the information handling system is configured to:
   boot an operating system stored on the memory;
   after booting the operating system, receive, from at least one remote server, information regarding a vulnerability associated with the firmware;
   create a firmware-specific feature flag based on the information regarding the vulnerability;
   store the firmware-specific feature flag in a cryptographically signed policy table with identifying information for the information handling resource;
   based on the cryptographically signed policy table, determine a resolution for mitigation of the vulnerability, wherein the resolution includes allowing the information handling resource to operate but disabling a particular feature of the information handling resource; and
   store information regarding the resolution in a storage location accessible to a preboot environment of the information handling system, wherein the preboot environment is configured to apply the resolution upon a subsequent boot of the information handling system.

2. The information handling system of claim 1, wherein the resolution includes preventing loading a driver associated with the information handling resource that includes the firmware.

3. The information handling system of claim 2, wherein the driver is a Unified Extensible Firmware Interface (UEFI) driver.

4. The information handling system of claim 1, wherein the preboot environment is a Basic Input/Output System of the information handling system.

5. The information handling system of claim 1, wherein storing the information regarding the resolution in the storage location accessible to the preboot environment includes:
   the operating system of the information handling system executing a persistent agent that has been presented to the operating system via a Windows Platform Binary Table (WPBT) channel; and
   the persistent agent storing the information regarding the resolution in a designated storage space accessible to the preboot environment.

6. The information handling system of claim 1, wherein the receiving, determining, and storing are carried out by a software agent executing on the operating system.

7. A method comprising:
   booting an information handling system an operating system, wherein the information handling system comprises an information handling resource that includes a firmware;
   after booting the operating system, the information handling system receiving, from at least one remote server, information regarding a vulnerability associated with the firmware;
   creating a firmware-specific feature flag based on the information regarding the vulnerability;
   storing the firmware-specific feature flag in a cryptographically signed policy table with identifying information for the information handling resource;
   based on the cryptographically signed policy table, the information handling system determining a resolution for mitigation of the vulnerability, wherein the resolution includes allowing the information handling resource to operate but disabling a particular feature of the information handling resource; and
   the information handling system storing information regarding the resolution in a storage location accessible to a preboot environment of the information handling system, wherein the preboot environment is configured to apply the resolution upon a subsequent boot of the information handling system.

8. The method of claim 7, further comprising the information handling system requesting the information regarding the vulnerability.

9. The method of claim 7, further comprising the information handling system receiving the information regarding the vulnerability without requesting such information.

10. An article of manufacture comprising a non-transitory, computer-readable medium having computer-executable code thereon that is executable by a processor of an information handling system for:
    booting an operating system;
    after booting the operating system, receiving, from at least one remote server, information regarding a vulnerability associated with a firmware of an information handling resource of the information handling system;
    creating a firmware-specific feature flag based on the information regarding the vulnerability;
    storing the firmware-specific feature flag in a cryptographically signed policy table with identifying information for the information handling resource;
    based on the cryptographically signed policy table, determining a resolution for mitigation of the vulnerability, wherein the resolution includes allowing the information handling resource to operate but disabling a particular feature of the information handling resource; and
    storing information regarding the resolution in a storage location accessible to a preboot environment of the information handling system, wherein the preboot environment is configured to apply the resolution upon a subsequent boot of the information handling system.

11. The article of claim 10, wherein the resolution includes preventing loading a driver associated with the information handling resource that includes the firmware.

12. The article of claim 11, wherein the driver is a Unified Extensible Firmware Interface (UEFI) driver.

13. The article of claim 10, wherein the preboot environment is a Basic Input/Output System of the information handling system.

14. The article of claim 10, wherein storing the information regarding the resolution in the storage location accessible to the preboot environment includes:
   the operating system of the information handling system executing a persistent agent that has been presented to the operating system via a Windows Platform Binary Table (WPBT) channel; and
   the persistent agent storing the information regarding the resolution in a designated storage space accessible to the preboot environment.

15. The article of claim 10, wherein the receiving, determining, and storing are carried out by a software agent executing on the operating system.

* * * * *